(12) United States Patent
Hartshorn et al.

(10) Patent No.: US 11,085,116 B2
(45) Date of Patent: Aug. 10, 2021

(54) ENGINE SHAFT ASSEMBLY AND METHOD

(71) Applicant: The Boeing Company, Chicago, IL (US)

(72) Inventors: Scott D. Hartshorn, Snohomish, WA (US); Keith D. Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 700 days.

(21) Appl. No.: 15/465,995

(22) Filed: Mar. 22, 2017

(65) Prior Publication Data

US 2018/0274387 A1 Sep. 27, 2018

(51) Int. Cl.
| | |
|---|---|
| *C23C 28/04* | (2006.01) |
| *F01D 5/02* | (2006.01) |
| *C23C 28/00* | (2006.01) |
| *F01D 5/08* | (2006.01) |
| *F01D 25/12* | (2006.01) |
| *F01D 25/26* | (2006.01) |

(52) U.S. Cl.
CPC .......... *C23C 28/042* (2013.01); *C23C 28/046* (2013.01); *C23C 28/322* (2013.01); *C23C 28/3455* (2013.01); *F01D 5/02* (2013.01); *F01D 5/08* (2013.01); *F01D 25/12* (2013.01); *F01D 25/26* (2013.01); *F05D 2300/20* (2013.01); *F05D 2300/2102* (2013.01); *F05D 2300/2118* (2013.01); *F05D 2300/5024* (2013.01); *Y02T 50/60* (2013.01)

(58) Field of Classification Search
CPC ..... C23C 28/042; F01D 5/288; F01D 5/3084; F01D 25/005; F01D 25/12; F01D 25/145; F01D 25/18
See application file for complete search history.

(56) References Cited

U.S. PATENT DOCUMENTS

| | | | | |
|---|---|---|---|---|
| 5,420,395 | A * | 5/1995 | Hyllberg | ............ G03G 15/0233 |
| | | | | 219/470 |
| 5,716,720 | A * | 2/1998 | Murphy | ................ C23C 14/083 |
| | | | | 148/537 |
| 7,507,070 | B2 * | 3/2009 | Jones | ........................ F01D 5/26 |
| | | | | 415/176 |
| 8,820,046 | B2 | 9/2014 | Ross et al. | |
| 2003/0049470 | A1* | 3/2003 | Maloney | ................ C04B 35/486 |
| | | | | 428/472 |
| 2006/0222884 | A1* | 10/2006 | Nagaraj | .................. F01D 5/288 |
| | | | | 428/688 |
| 2007/0140840 | A1* | 6/2007 | Schmitz | ................ C23C 28/347 |
| | | | | 415/200 |
| 2012/0099971 | A1* | 4/2012 | Bintz | ..................... C23C 28/022 |
| | | | | 415/173.6 |
| 2012/0099972 | A1* | 4/2012 | Guo | .......................... C23C 4/18 |
| | | | | 415/174.4 |
| 2012/0213245 | A1* | 8/2012 | Noda | ..................... G01J 5/0025 |
| | | | | 374/44 |

(Continued)

*Primary Examiner* — Richard A Edgar
*Assistant Examiner* — Aye S Htay
(74) *Attorney, Agent, or Firm* — Walters & Wasylyna LLC

(57) ABSTRACT

An engine shaft assembly for an engine is provided. The engine shaft assembly includes a shaft and a thermal distribution layer. The thermal distribution layer is provided on the shaft, and is configured to minimize the effect of distortion of the shaft caused by asymmetric cooling on shutdown of the engine.

20 Claims, 8 Drawing Sheets

(56) References Cited

U.S. PATENT DOCUMENTS

| | | | | |
|---|---|---|---|---|
| 2012/0307216 A1* | 12/2012 | Laurent | .................. | G03F 7/707 |
| | | | | 355/30 |
| 2014/0167244 A1* | 6/2014 | Yang | .................. | H01L 23/3675 |
| | | | | 257/712 |
| 2016/0137559 A1* | 5/2016 | Chamberlain | ........ | C22C 27/025 |
| | | | | 428/454 |
| 2018/0212191 A1* | 7/2018 | Jin | .......................... | H01L 51/56 |

* cited by examiner

ENGINE SHAFT ASSEMBLY AND METHOD

FIELD

This application relates to an engine shaft assembly and method of making the engine shaft assembly that minimizes the effect of distortion of the shaft caused by asymmetric cooling on shutdown of the engine.

BACKGROUND

Turbine engines work by extracting energy from fuel burned in an air mixture. The combusted air turns turbine blades, which spins the engine shaft or rotor, from which useful work can be extracted. These type of engines are used to provide the thrust on jet airplanes. The combustion causes an increase in temperature in many parts of the engine including turbine blades and the engine shaft. Turbine blades currently use several different coatings for insulation with zirconium dioxide generally being one material used in the coatings.

When the engine is shut down, the engine shaft cools down, but it does not cool down evenly. Asymmetric cooling causes the top of the engine shaft to be hotter than the bottom of the engine shaft. The temperature difference in the engine shaft can cause the shaft to bend. This is known as a "bowed rotor". This condition results in an offset between the center of gravity of the bowed rotor and the bearing axis, causing a slight imbalance and potentially reducing the tight clearance between the shaft blade tips and the casing. If the engine is then turned on during the bowed rotor condition, it can damage the aerodynamic blades on the shaft due to closing of the gaps in the tight clearances between the blades and the casings. The damage might impact the fuel efficiency of the engine, or it might be severe enough to require the airplane to be grounded while it is repaired.

If the engine is allowed to cool for long enough, eventually the temperature gradient in the shaft will cease and the shaft will be straight again. In many commercial jet engines, the worst shaft bows occur between 30 and 120 minutes after shutting down the engines. This is problematic because many commercial airlines attempt to turn an airplane around at the gate within the 30 to 120 minute time window.

Existing solutions to the bowed rotor condition include increasing the clearances on the blades inside the engine. However, this solution decreases engine performance. Another solution includes using a small electric motor, or external source to turn the engine after it shuts down to cause even cooling of the engine shaft. However, the drawback of this solution is that it requires additional components in the engine, or additional support infrastructure on the ground. Another solution is to slowly turn the engine on over an extended period of time, often 3-7 minutes per engine to allow time for the temperature to even out in the engine shaft. However, this operation can delay the departure of flights.

In addition, engine shafts operate in a severe environment. They are subjected to high temperatures, and potential wear as the shaft rotates. The environment is similar to, but less severe than the environment to which shaft blades are subjected.

SUMMARY

In one example, an engine shaft assembly for an engine is provided. The engine shaft assembly includes a shaft and a thermal distribution layer. The thermal distribution layer is provided on the shaft, and is configured to minimize the effect of distortion of the shaft caused by asymmetric cooling on shutdown of the engine.

In one example, a gas turbine engine is provided and includes a casing and an engine shaft assembly. The engine shaft assembly is provided in the casing. The engine shaft assembly includes a shaft and a thermal distribution layer provided on the shaft. The thermal distribution layer includes at least a first thermal insulation sublayer, a second thermal insulation sublayer, and at least one thermal conduction sublayer. The thermal conduction sublayer is disposed between the first thermal insulation sublayer and the second thermal insulation sublayer. The engine shaft assembly further includes turbine blades that are secured to the shaft and extend radially outward from the shaft. The gas turbine engine further includes bearings. The bearings are provided in the casing and are operatively connected to the shaft to support the engine shaft assembly.

In another example, a method for minimizing distortion of a shaft of an engine due to asymmetric cooling upon shutdown of the engine is provided. The method includes applying a thermal distribution layer to the shaft.

Other examples of the disclosed engine shaft assembly and method of making the engine shaft assembly will become apparent from the following detailed description, the accompanying drawings and the appended claims.

DETAILED DESCRIPTION

Figure 1:
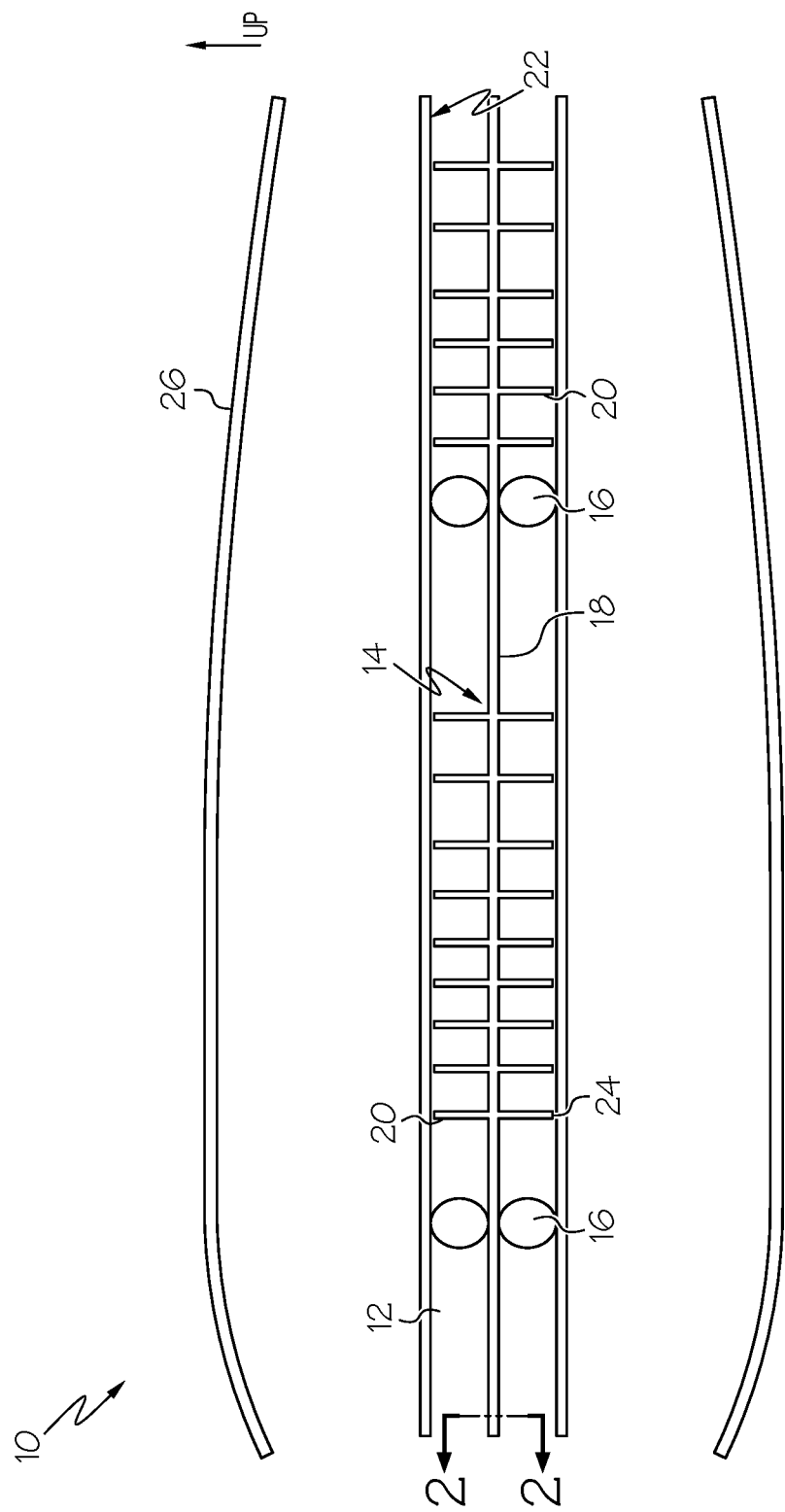
FIG. 1 is a schematic side view of a gas turbine engine according to one example.

FIG. 1 shows a gas turbine engine 10 that comprises an engine casing 12 that houses an engine shaft assembly 14. Bearings 16, such as ball or roller bearings, support the engine shaft assembly 14 and allow rotation of the engine shaft assembly 14. The engine shaft assembly 14 includes a turbine or engine shaft 18 and a plurality of turbine blades 20. The turbine blades 20 are secured to the engine shaft 18 and extend radially outward from the engine shaft 18 with respect to the longitudinal axis of the engine shaft 18. Each turbine blade 20 extends a small distance from the inner surface 22 of the casing 12 thereby defining a gap between the tip 24 of the turbine blade 20 and the inner surface 22 of the casing 12. The high temperature and high pressure gas produced by the combustion in the gas turbine engine 10 turns the turbine blades 20, which rotates the engine shaft 18, from which useful work can be extracted. The gas turbine engine 10 also includes an outer cowling 26 that houses the engine components.

Figure 2:
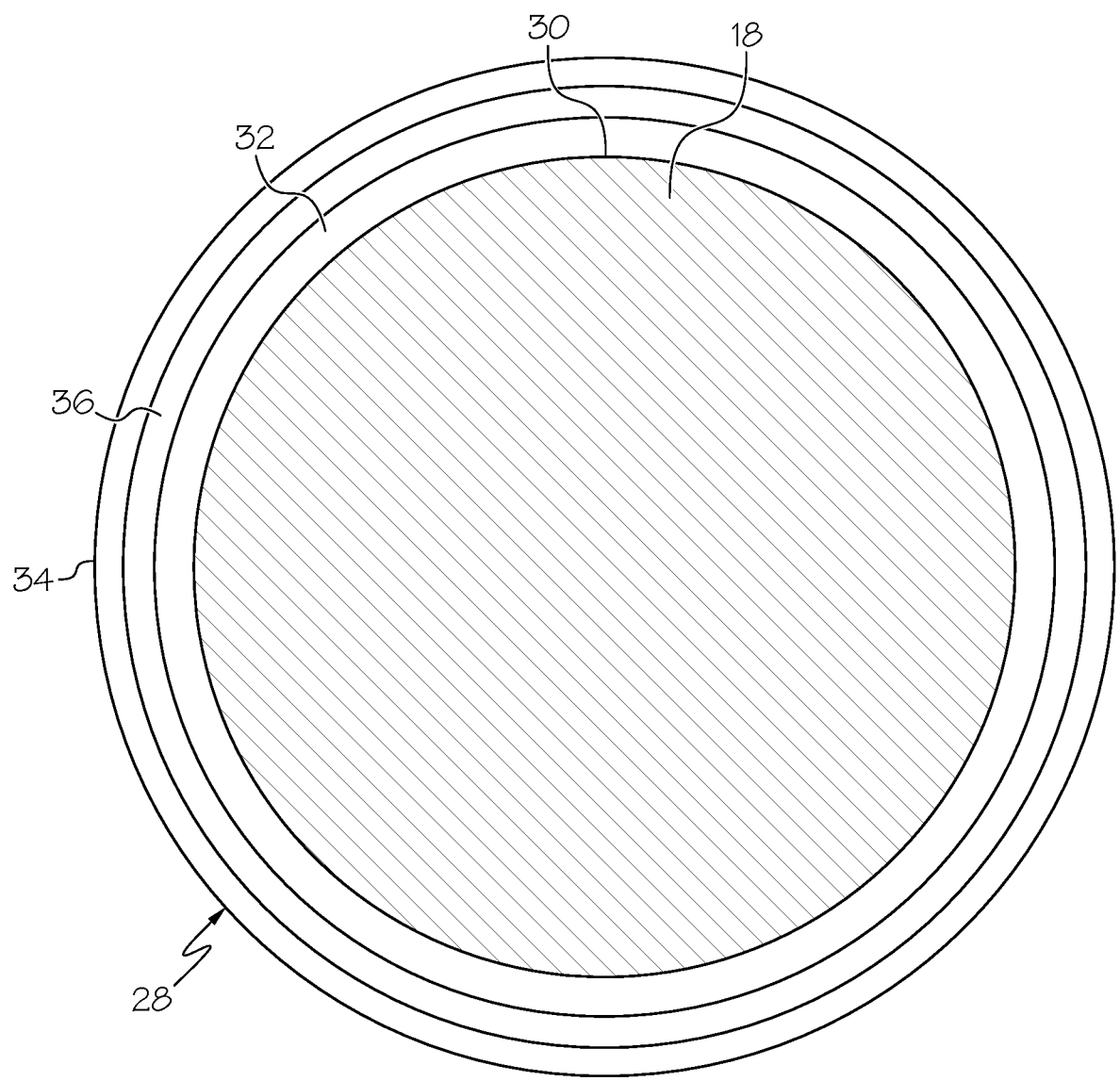
FIG. 2 is a cross-sectional view taken along line 2-2 of FIG. 1.
Figure 3:
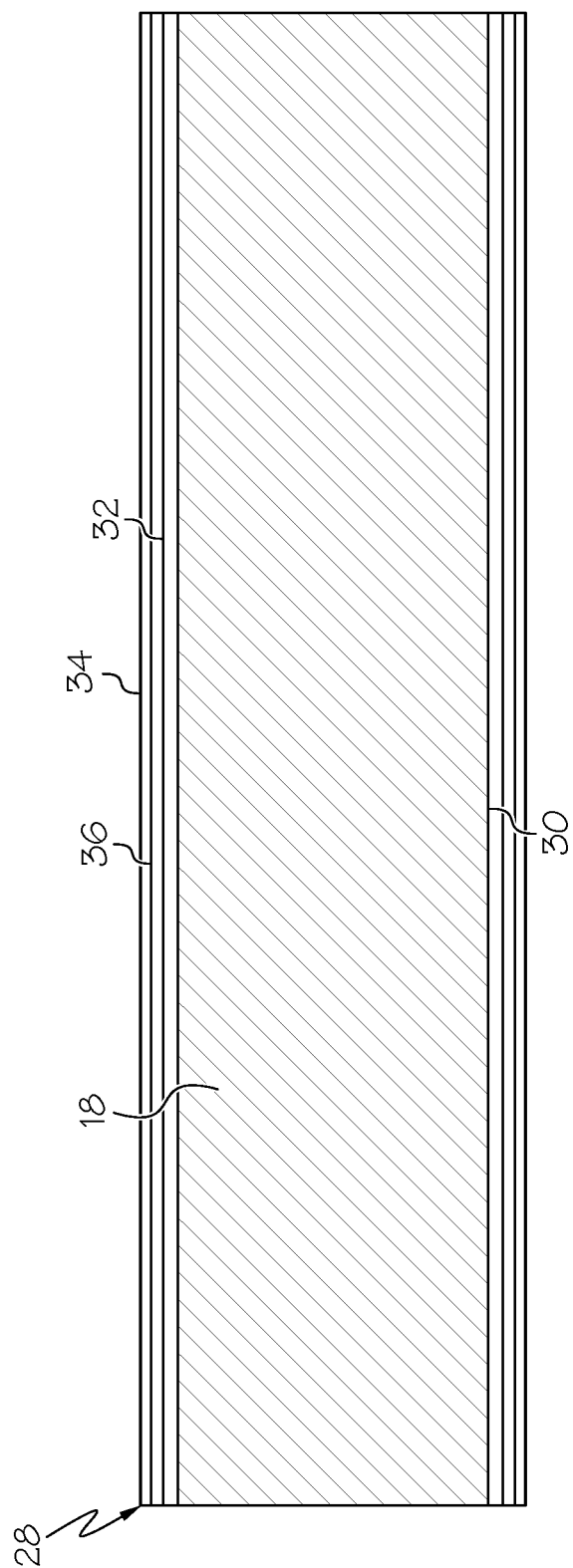
FIG. 3 is a longitudinal cross-sectional view of the shaft with the thermal distribution layer of FIG. 1.

As illustrated in FIGS. 2 and 3, the engine shaft 18 is generally elongated and shaped in the form of a cylinder. The engine shaft 18 is made of a metal material such as steel. The steel has a thermal conductivity of around 40 W/m K at 20° C. The engine shaft assembly 14 includes a thermal distribution layer 28 that coats the surface 30 of the engine shaft 18. The thermal distribution layer 28 may coat the entire surface 30 of the engine shaft 18 or a portion of the surface 30 such as coating the surface 30 of the engine shaft 18 except for the bases or axial ends of the engine shaft 18. The thermal distribution layer 28 may be configured in one or more ways to minimize the effect of distortion of the engine shaft 18 caused by asymmetric cooling on shutdown of the gas turbine engine 10. In one way, the thermal distribution layer 28 is configured to cause the engine shaft 18 to cool down substantially evenly thereby limiting the distortion of the engine shaft 18 caused by the asymmetric cooling on shutdown of the gas turbine engine 10.

In another way, the thermal distribution layer 28 is configured to increase the period that the engine shaft 18 cool downs to a predetermined temperature (e.g. 20° C.) after engine shut down. In other words, without the thermal distribution layer 28 coated on the engine shaft 18, the engine shaft 18 cool downs to the predetermined temperature after a first period (e.g. 120 minutes) upon shutdown of the gas turbine engine 10. However, when the engine shaft 18 is coated with the thermal distribution layer 28, the thermal distribution layer 28 causes the engine shaft 18 to cool down to the predetermined temperature after a second period (e.g. 500 minutes) upon shutdown of gas turbine engine 10 that is substantially greater than the first period. Essentially, the increase in this time increases the time it takes to develop the bowed rotor condition after shutdown of the gas turbine engine 10.

In another way, the thermal distribution layer 28 is configured to decrease the temperature gradient within the engine shaft 18 (e.g. from 40° C. to 2° C.) when the thermal distribution layer 28 is provided on the engine shaft 18. A decrease in the rate at which the engine shaft 18 cools allows for more thermal conduction within the engine shaft 18 itself. This results in a smaller temperature gradient, and as a result less of a bend of the engine shaft 18.

In another way, the thermal distribution layer 28 is additionally configured to decrease the maximum temperature (e.g. from 500° C. to 400° C.) that the engine shaft 18 reaches during operation of the gas turbine engine 10. Since an insulated engine shaft 18 will not reach as high of a temperature during operation of the gas turbine engine 10, the asymmetric cooling on shutdown of the gas turbine engine 10 will be reduced, and hence the insulated engine shaft 18 will be less prone to bowing.

As seen in FIGS. 2 and 3, the thermal distribution layer 28 comprises an inner thermal insulation sublayer 32, an outer thermal insulation sublayer 34, and a thermal conduction sublayer 36 disposed between the inner thermal insulation sublayer 32 and the outer thermal insulation sublayer 34. The inner thermal insulation sublayer 32 is coated on the surface 30 of the engine shaft 18. The thermal conduction sublayer 36 is applied on the inner thermal sublayer 32, and the outer thermal insulation sublayer 34 is applied on the thermal conduction sublayer 36.

The inner thermal insulation sublayer 32 may be comprised of zirconium dioxide and have a thickness of about 100 micrometers to about 2 millimeters. Alternatively, the inner thermal insulation sublayer 32 may be comprised of calcium silicate and have a thickness of about 10 micrometers to about 10 millimeters. In another alternative version, the inner thermal insulation sublayer 32 may be comprised of fiberglass and have a thickness of about 30 micrometers to about 10 millimeters.

Likewise, the outer thermal insulation sublayer 34 may be comprised of zirconium dioxide and have a thickness of about 100 micrometers to about 2 millimeters. Alternatively, the outer thermal insulation sublayer 34 may be comprised of calcium silicate and have a thickness of about 10 micrometers to about 10 millimeters. In another alternative version, the outer thermal insulation sublayer 34 may be comprised of fiberglass and have a thickness of about 30 micrometers to about 10 millimeters. As used herein, the thermal insulation material of each of the thermal insulation sublayers 32, 34 has a thermal conductivity that is less than 1 W/(m K) at 20° C., which is at least one order of magnitude lower than the thermal conductivity of the engine shaft 18. For example, the thermal insulation material of each of the thermal insulation sublayers 32, 34 may have a thermal conductivity of about 0.001 to about 4.0 W/(m K) at 20° C.

The thermal conduction sublayer 36 has a thickness of about 100 nanometers to about 2 millimeters. The thermal conduction sublayer 36 may be comprised of copper, aluminum and/or graphene. As used herein, the thermal conduction material of the thermal conduction sublayer 36 has a thermal conductivity of at least about 40 W/(m K) at 20° C., such as about 40 to about 1500 W/(m K) at 20° C. Thus, the thermal conduction sublayer 36 may have an equivalent or higher thermal conductivity as that of the engine shaft 18 with a higher thermal conductivity being better in minimizing the effect of distortion of the engine shaft 18 caused by asymmetric cooling on shutdown of the engine. Other suitable materials may be used for the thermal insulation and thermal conduction sublayers 32, 34, 36 instead of or in combination with those mentioned above to minimize the effect of distortion of the shaft caused by asymmetric cooling on shutdown of the engine.

Figure 4:
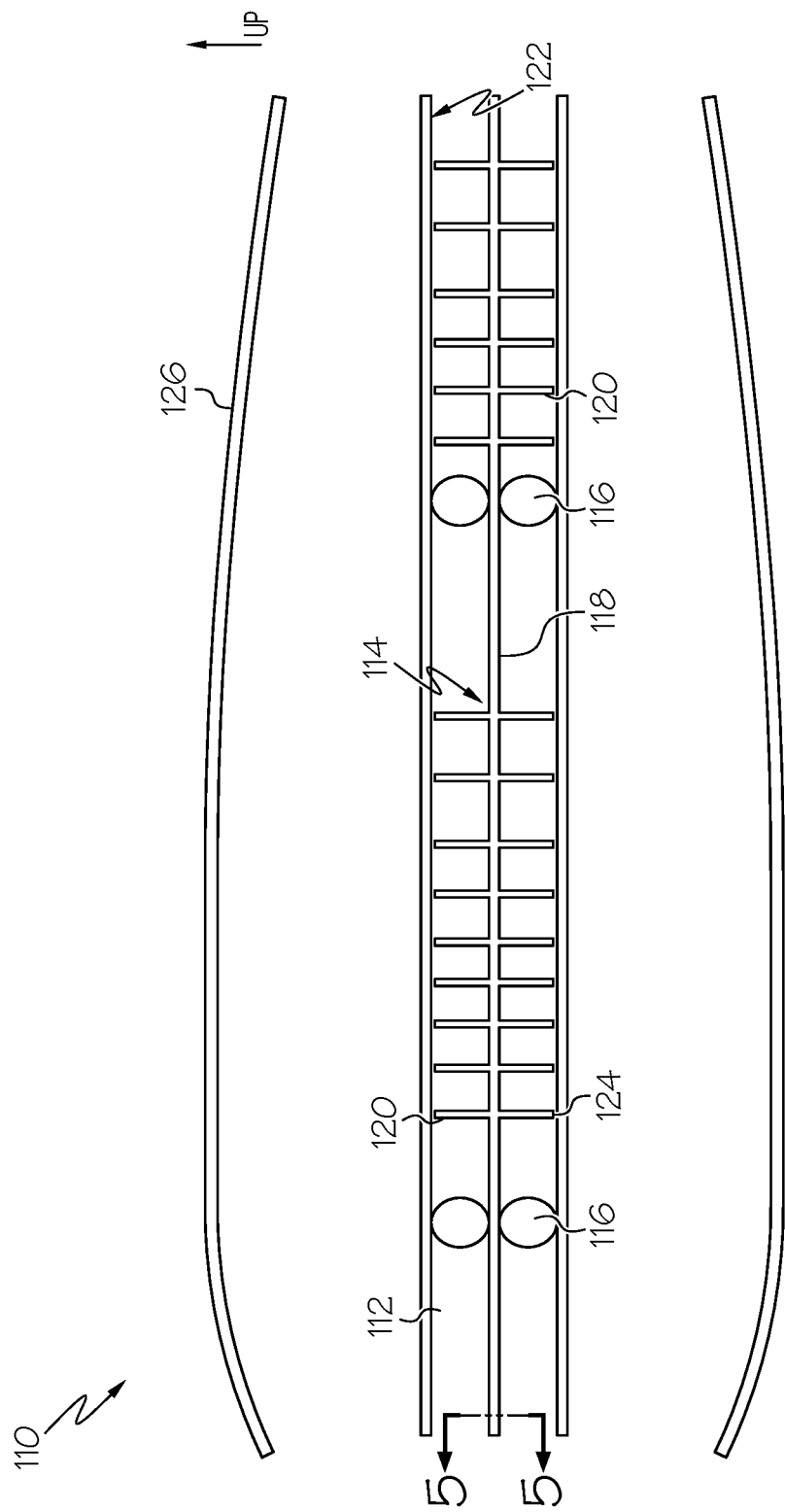
FIG. 4 is a schematic side view of a gas turbine engine according to another example.

FIG. 4 shows a gas turbine engine 110 with an engine shaft assembly 114 according to another example. In this example, the gas turbine engine 100 comprises an engine casing 112 that houses the engine shaft assembly 114. Bearings 116, such as ball or roller bearings, support the engine shaft assembly 114 and allow rotation of the engine shaft assembly 114. The engine shaft assembly 114 includes a hollow turbine or engine shaft 118 and a plurality of turbine blades 120. The turbine blades 120 are secured to the engine shaft 118 and extend radially outward from the engine shaft 118 with respect to the longitudinal axis of the engine shaft 118. Each turbine blade 120 extends a small distance from the inner surface 122 of the casing 112 thereby defining a gap between the tip 124 of the turbine blade 120 and the inner surface 122 of the casing 112. The high temperature and high pressure gas produced by the combustion in the gas turbine engine 110 turns the turbine blades 120, which rotates the engine shaft 118, from which useful work can be extracted. The gas turbine engine 110 also includes an outer cowling 126 that houses the engine components.

Figure 5:
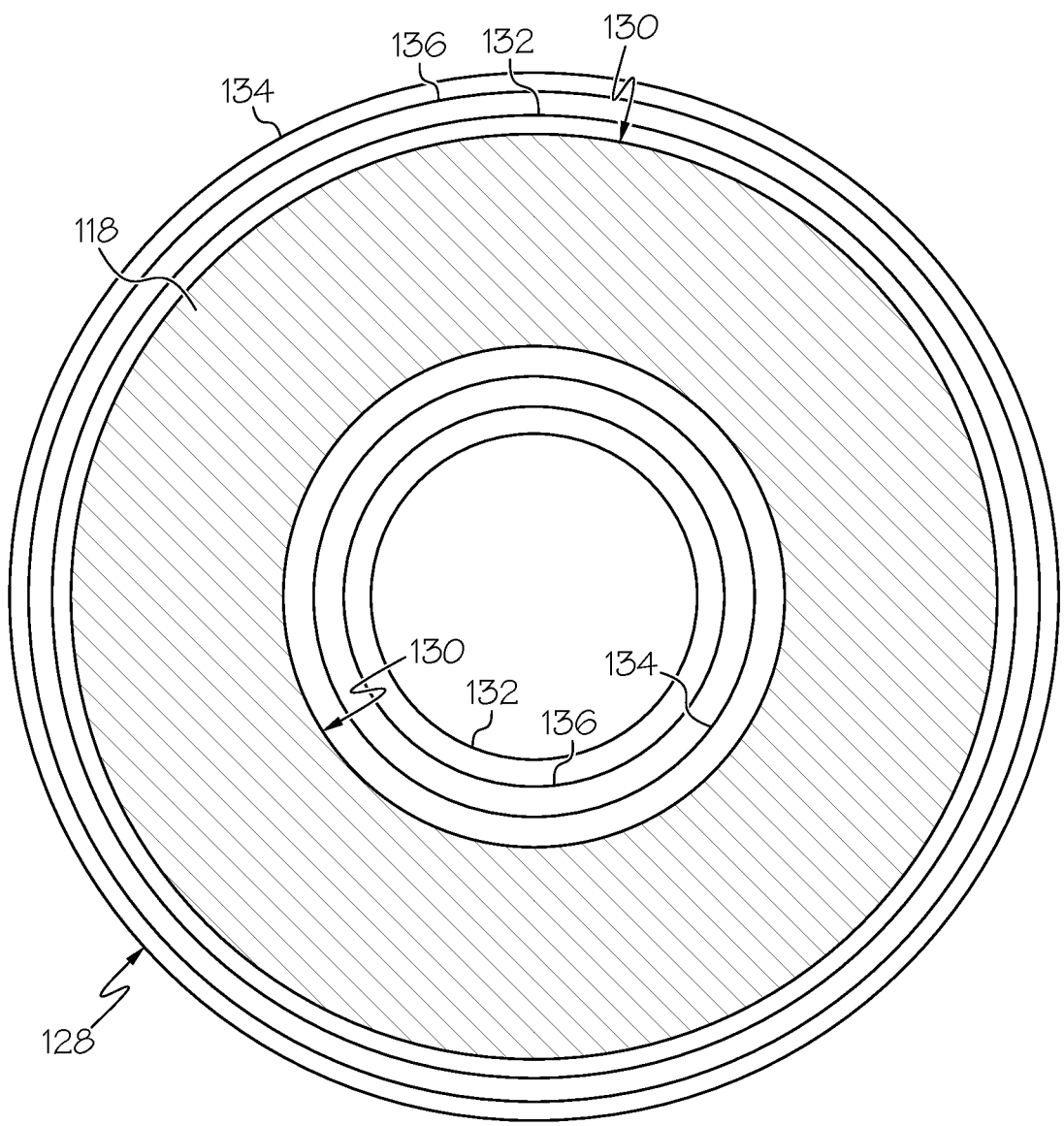
FIG. 5 is a cross-sectional view taken along line 5-5 of FIG. 4.
Figure 6:
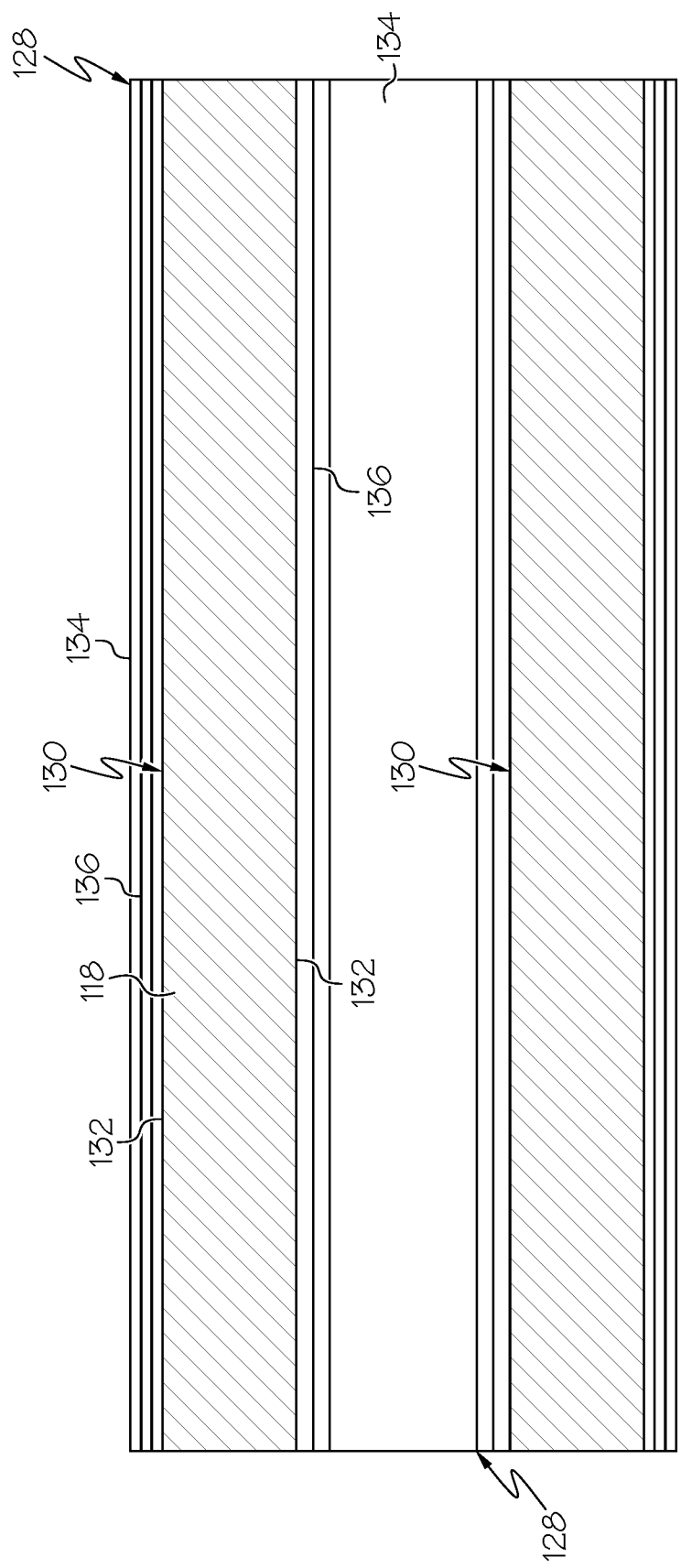
FIG. 6 is a longitudinal cross-sectional view of the shaft with the thermal distribution layer of FIG. 4.

As illustrated in FIGS. 5 and 6, the engine shaft 118 is generally elongated and shaped in the form of a hollow cylinder. The engine shaft 118 is made of a metal material such as steel. The steel has a thermal conductivity of around 40 W/m K at 20° C. The engine shaft assembly 114 includes a thermal distribution layer 128 that coats the surface 130 of the engine shaft 118. The thermal distribution layer 128 may coat the entire surface 130 of the engine shaft 118 or a portion of the surface 130 such as coating the surface 130 of the engine shaft 118 except for the bases or axial ends of the engine shaft 118. The thermal distribution layer 128 may be configured in one or more ways to minimize the effect of distortion of the engine shaft 118 caused by asymmetric cooling on shutdown of the gas turbine engine 10. In one way, the thermal distribution layer 128 is configured to cause the engine shaft 118 to cool down substantially evenly thereby limiting the distortion of the engine shaft 118 caused by the asymmetric cooling on shutdown of the gas turbine engine 110.

In another way, the thermal distribution layer 128 is configured to increase the period that the engine shaft 118 cool downs to a predetermined temperature (e.g. 20° C.) after engine shut down. In other words, without the thermal distribution layer 128 coated on the engine shaft 118, the engine shaft 118 cool downs to the predetermined temperature after a first period (e.g. 120 minutes) upon shutdown of the gas turbine engine 110. However, when the engine shaft 118 is coated with the thermal distribution layer 128, the thermal distribution layer 128 causes the engine shaft 118 to cool down to the predetermined temperature after a second period (e.g. 500 minutes) upon shutdown of gas turbine engine 110 that is substantially greater than the first period. Essentially, the increase in this time increases the time it takes to develop the bowed rotor condition after shutdown of the gas turbine engine 110.

In another way, the thermal distribution layer 128 is configured to decrease the temperature gradient within the engine shaft 118 (e.g. from 40° C. to 2° C.) when the thermal distribution layer 128 is provided on the engine shaft 118. A decrease in the rate at which the engine shaft 118 cools allows for more thermal conduction within the engine shaft 118 itself. This results in a smaller temperature gradient, and as a result less of a bend of the engine shaft 118.

In another way, the thermal distribution layer 128 is additionally configured to decrease the maximum temperature (e.g. from 500° C. to 400° C.) that the engine shaft 118 reaches during operation of the gas turbine engine 110. Since an insulated engine shaft 118 will not reach as high of a temperature during operation of the gas turbine engine 110, the asymmetric cooling on shutdown of the gas turbine engine 110 will be reduced, and hence the insulated engine shaft 118 will be less prone to bowing.

As seen in FIGS. 5 and 6, the thermal distribution layer 128 comprises a first thermal insulation sublayer 132, a second thermal insulation sublayer 134, and a thermal conduction sublayer 136 disposed between the first thermal insulation sublayer 132 and the second thermal insulation sublayer 134. The first thermal insulation sublayer 132 is coated on the surface 130 of the engine shaft 118. The thermal conduction sublayer 136 is applied on the first thermal insulation sublayer 132, and the second thermal insulation sublayer 134 is applied on the thermal conduction sublayer 136.

The first thermal insulation sublayer 132 may be comprised of zirconium dioxide and have a thickness of about 100 micrometers to about 2 millimeters. Alternatively, the first thermal insulation sublayer 132 may be comprised of calcium silicate and have a thickness of about 10 micrometers to about 10 millimeters. In another alternative version, the first thermal insulation sublayer 132 may be comprised of fiberglass and have a thickness of about 30 micrometers to about 10 millimeters.

Likewise, the second thermal insulation sublayer 134 may be comprised of zirconium dioxide and have a thickness of about 100 micrometers to about 2 millimeters. Alternatively, the second thermal insulation sublayer 134 may be comprised of calcium silicate and have a thickness of about 10 micrometers to about 10 millimeters. In another alternative version, the second thermal insulation sublayer 134 may be comprised of fiberglass and have a thickness of about 30 micrometers to about 10 millimeters. As used herein, the thermal insulation material of each of the thermal insulation sublayers 132, 134 has a thermal conductivity that is less than 1 W/(m K) at 20° C., which is at least one order of magnitude lower than the thermal conductivity of the engine shaft 118. For example, the thermal insulation material of each of the thermal insulation sublayers 132, 134 may have a thermal conductivity of about 0.001 to about 4.0 W/(m K) at 20° C.

The thermal conduction sublayer 136 has a thickness of about 100 nanometers to about 2 millimeters. The thermal conduction sublayer 136 may be comprised of copper, aluminum and/or graphene. As used herein, the thermal conduction material of the thermal conduction sublayer 136 has a thermal conductivity of at least about 40 W/(m K) at 20° C., such as about 40 to about 1500 W/(m K) at 20° C. Thus, the thermal conduction sublayer 136 may have an equivalent or higher thermal conductivity as that of the engine shaft 118 with a higher thermal conductivity being better in minimizing the effect of distortion of the engine shaft 118 caused by asymmetric cooling on shutdown of the engine. Other suitable materials may be used for the thermal insulation and conduction sublayers 132, 134, 136 instead of or with those mentioned above to minimize the effect of distortion of the engine shaft 118 caused by asymmetric cooling on shutdown of the engine.

Figure 7:
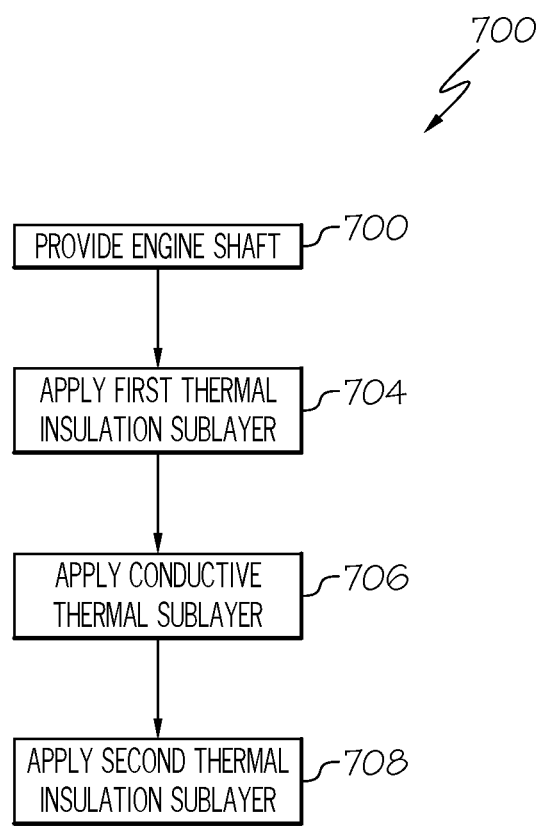
FIG. 7 is flow diagram of a method for making a blade assembly for a gas turbine engine according to one example.

FIG. 7 shows a method 700 for minimizing distortion of the engine shaft 18, 118 of the gas turbine engine 10, 110 due to asymmetric cooling upon shutdown of the gas turbine engine 10, 110. First, in step 702, the engine shaft 18, 118 is provided. Then, in step 704, the inner or first thermal insulation sublayer 32, 132 of the thermal distribution layer 28, 128 is applied to the surface 30, 130 of the engine shaft 18, 118. The inner or first thermal insulation sublayer 32, 132 may be applied by any suitable process such as, for example, either plasma spraying, wrapping, or filament winding the inner or first thermal insulation sublayer 32, 132 onto the surface 30, 130 of the engine shaft 18, 118. Then, in step 706, the thermal conduction sublayer 36, 136 of the thermal distribution layer 28, 128 is applied to the inner or first thermal insulation sublayer 32, 132. The thermal conduction sublayer 36, 136 may be applied by any suitable process such as, for example, either electroplating, thermal spraying, or plasma spraying the thermal conduction sublayer 36, 136 onto the inner or first thermal insulation sublayer 32, 132. Then, in step 708, the outer or second thermal insulation sublayer 34, 134 of the thermal distribution layer 28, 128 is applied to the thermal conduction sublayer 36, 136. The outer or second thermal insulation sublayer 34, 134 may be applied by any suitable process such as, for example, either plasma spraying, wrapping, or filament winding the outer or second thermal insulation sublayer 34, 134 onto the thermal conduction sublayer 36, 136.

Although the thermal distribution layer 28, 128 for the above examples comprises a thermal conduction sublayer disposed between two thermal insulation sublayers, it is contemplated that the thermal distribution layer may comprise any number or combination of thermal insulation sublayers and/or thermal conduction sublayers in various arrangements. For example, the thermal distribution layer may comprise a thermal conduction sublayer that is provided on the engine shaft and applied by any suitable process such as, for example, either electroplating, thermal spraying, or plasma spraying, and a thermal insulation sublayer that is provided on the thermal conduction sublayer and applied by any suitable process such as, for example, either plasma spraying, wrapping, or filament winding. In another example, the thermal distribution layer may be comprise one thermal insulation layer or one thermal conduction layer provided on the engine shaft and applied by the above-mentioned suitable processes.

Figure 8:
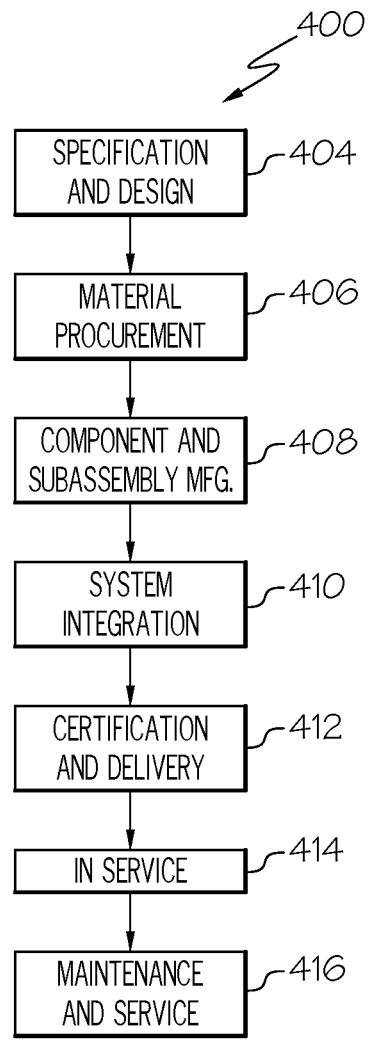
FIG. 8 is flow diagram of an aircraft manufacturing and service methodology.
Figure 9:
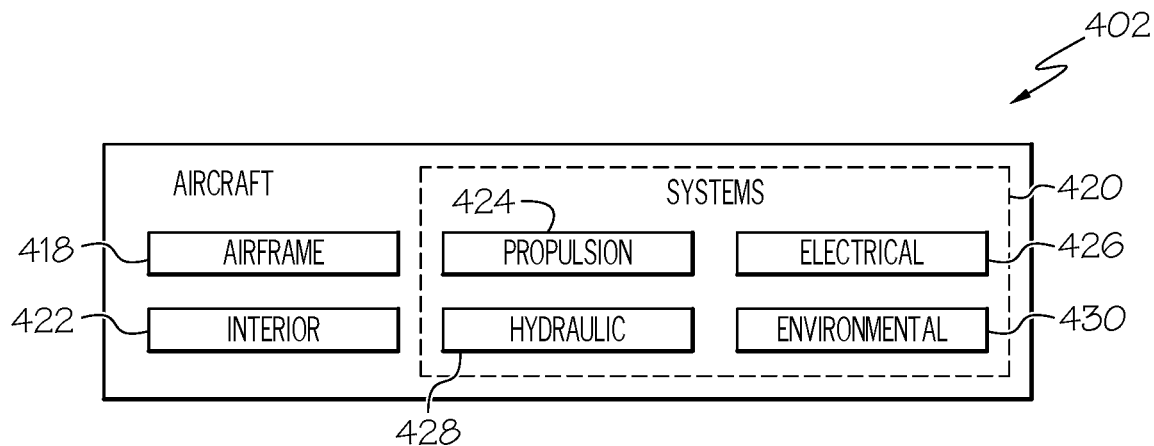
FIG. 9 is a block diagram of an aircraft.

Examples of the disclosure may be described in the context of an aircraft manufacturing and service method 400, as shown in FIG. 8, and an aircraft 402, as shown in FIG. 9. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, single individual, and so on.

As shown in FIG. 9, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included such as weapons and electronics.

The disclosed method of applying the thermal distribution layer to the engine shaft may be employed during any one or more of the stages of the aircraft manufacturing and service method 400. As one example, the disclosed method of applying the thermal distribution layer to the engine shaft may be employed during material procurement 406. As another example, components or subassemblies corresponding to component/subassembly manufacturing 408, system integration 410, and or maintenance and service 416 may be fabricated or manufactured using the method of applying the thermal distribution layer to the engine shaft. As another example, the airframe 418 and/or the interior 422 may be constructed using the disclosed method of applying the thermal distribution layer to the engine shaft. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed engine shaft assembly and method of making the engine shaft assembly that minimizes the effect of distortion of the shaft caused by asymmetric cooling on shutdown of the engine are described in the context of an aircraft; however, one of ordinary skill in the art will readily recognize that the engine shaft assembly and method of making the engine shaft assembly may be utilized for a variety of vehicles, as well as for non-vehicle applications. For example, implementations of the examples described herein may be implemented in any type of vehicle including, e.g., passenger and military ships, spacecraft, automobiles and the like.

By reducing the amount of bending that occurs in an engine shaft after it shuts down, this application allows an engine to be built with reduced gaps between the shaft blade tips and the compressor wall, increasing enabling a higher efficiency engine. Also the reduced bending reduces the chance of pre-mature wear to the turbine blades. This application will also prevent impact events due to a bowed rotor condition, which grounds a plane for an expensive repair. The thermal distribution layer on the engine shaft may be applied to a newly designed engine shaft on future generations of engines, or the thermal distribution layer could be retrofitted on existing engine shafts.

Although various examples of the disclosed engine shaft assembly and method of making the engine shaft assembly have been shown and described, modifications may occur to those skilled in the art upon reading the specification. The present application includes such modifications and is limited only by the scope of the claims.

What is claimed is:

1. An engine shaft assembly for an engine comprising:
   a shaft; and
   a thermal distribution layer provided on said shaft, said thermal distribution layer comprising a first thermal insulation sublayer, a second thermal insulation sublayer, and a thermal conduction sublayer having a thermal conductivity of at least 40 W/(m K) at 20° C., wherein said thermal conduction sublayer is disposed between said first thermal insulation sublayer and said second thermal insulation sublayer.

2. The engine shaft assembly of claim 1 wherein:
   said first thermal insulation sublayer comprises at least one of zirconium dioxide, calcium silicate and fiberglass, and
   said second thermal insulation sublayer comprises at least one of zirconium dioxide, calcium silicate and fiberglass.

3. The engine shaft assembly of claim 1 wherein said thermal conduction sublayer comprises at least one of copper, aluminum and graphene.

4. The engine shaft assembly of claim 1 wherein:
   said first thermal insulation sublayer comprises at least one of zirconium dioxide having a thickness of 100 micrometers to 2 millimeters, calcium silicate having a thickness of 10 micrometers to 10 millimeters, and fiberglass having a thickness of 30 micrometers to 10 millimeters,
   said second thermal insulation sublayer comprises at least one of zirconium dioxide having a thickness of 100 micrometers to 2 millimeters, calcium silicate having a thickness of 10 micrometers to 10 millimeters, and fiberglass having a thickness of 30 micrometers to 10 millimeters, and
   said thermal conduction sublayer has a thickness of 100 nanometers to 2 millimeters.

5. The engine shaft assembly of claim 1 wherein said thermal conduction sublayer extends around an entire circumference of said shaft.

6. The engine shaft assembly of claim 1 wherein said second thermal insulation sublayer is positioned at an outer surface of said engine shaft assembly.

7. The engine shaft assembly of claim 1 wherein said first thermal insulation sublayer is directly on said shaft, said thermal conduction sublayer is directly on said first thermal insulation sublayer, and said second thermal insulation sublayer is directly on said thermal conduction sublayer.

8. The engine shaft assembly of claim 7 wherein said first thermal insulation sublayer extends along an entire axial length of said shaft.

9. The engine shaft assembly of claim 7 wherein said second thermal insulation sublayer extends along an entire axial length of said shaft.

10. The engine shaft assembly of claim 7 wherein said thermal conduction sublayer extends around an entire circumference of said shaft.

11. The engine shaft assembly of claim 7 wherein said shaft is made of a metal material.

12. The engine shaft assembly of claim 7 wherein said shaft is made of steel.

13. The engine shaft assembly of claim 1 wherein said shaft is made of a metal material.

14. The engine shaft assembly of claim 1 wherein said shaft is made of steel.

15. A gas turbine engine comprising:
a casing;
an engine shaft assembly, wherein said engine shaft assembly is provided in said casing, wherein said engine shaft assembly comprises:
a shaft;
a thermal distribution layer provided on said shaft, wherein said thermal distribution layer comprises a first thermal insulation sublayer, a second thermal insulation sublayer, and a thermal conduction sublayer having a thermal conductivity of at least 40 W/(m K) at 20° C., and wherein said thermal conduction sublayer is disposed between said first thermal insulation sublayer and said second thermal insulation sublayer;
turbine blades, wherein said turbine blades are secured to said shaft and extend radially outward from said shaft; and
bearings, wherein said bearings are provided in said casing and are operatively connected to said shaft to support said engine shaft assembly.

16. The gas turbine engine of claim 15 wherein:
said first thermal insulation sublayer comprises at least one of zirconium dioxide, calcium silicate and fiberglass, and
said second thermal insulation sublayer comprises at least one of zirconium dioxide, calcium silicate and fiberglass.

17. The gas turbine engine of claim 15 wherein said thermal conduction sublayer comprises at least one of copper, aluminum and graphene.

18. A method for minimizing distortion of a shaft of an engine due to asymmetric cooling upon shutdown of said engine, said method comprising:
applying a thermal distribution layer to said shaft, wherein said thermal distribution layer comprises a first thermal insulation sublayer, a second thermal insulation sublayer, and a thermal conduction sublayer having a thermal conductivity of at least 40 W/(m K) at 20° C., wherein said thermal conduction sublayer is disposed between said first thermal insulation sublayer and said second thermal insulation sublayer.

19. The method of claim 18 wherein said applying said thermal distribution layer to said shaft comprises:
applying said first thermal insulation sublayer to said shaft;
applying said thermal conduction sublayer to said first thermal insulation sublayer; and
applying said second thermal insulation sublayer to said thermal conduction sublayer.

20. The method of claim 19 wherein:
said applying said first thermal insulation sublayer to said shaft comprises at least one of plasma spraying, wrapping and filament winding said first thermal insulation sublayer onto said shaft,
said applying said thermal conduction sublayer to said first thermal insulation sublayer comprises at least one of electroplating, thermal spraying and plasma spraying said thermal conduction sublayer onto said first thermal insulation sublayer, and
said applying said second thermal insulation sublayer to said thermal conduction sublayer comprises at least one of plasma spraying, wrapping and filament winding said second thermal insulation sublayer onto said thermal conduction sublayer.

* * * * *